Oct. 10, 1939.   E. ROBERTS   2,175,996
PROCESSING WHITE SUGAR
Filed May 1, 1937
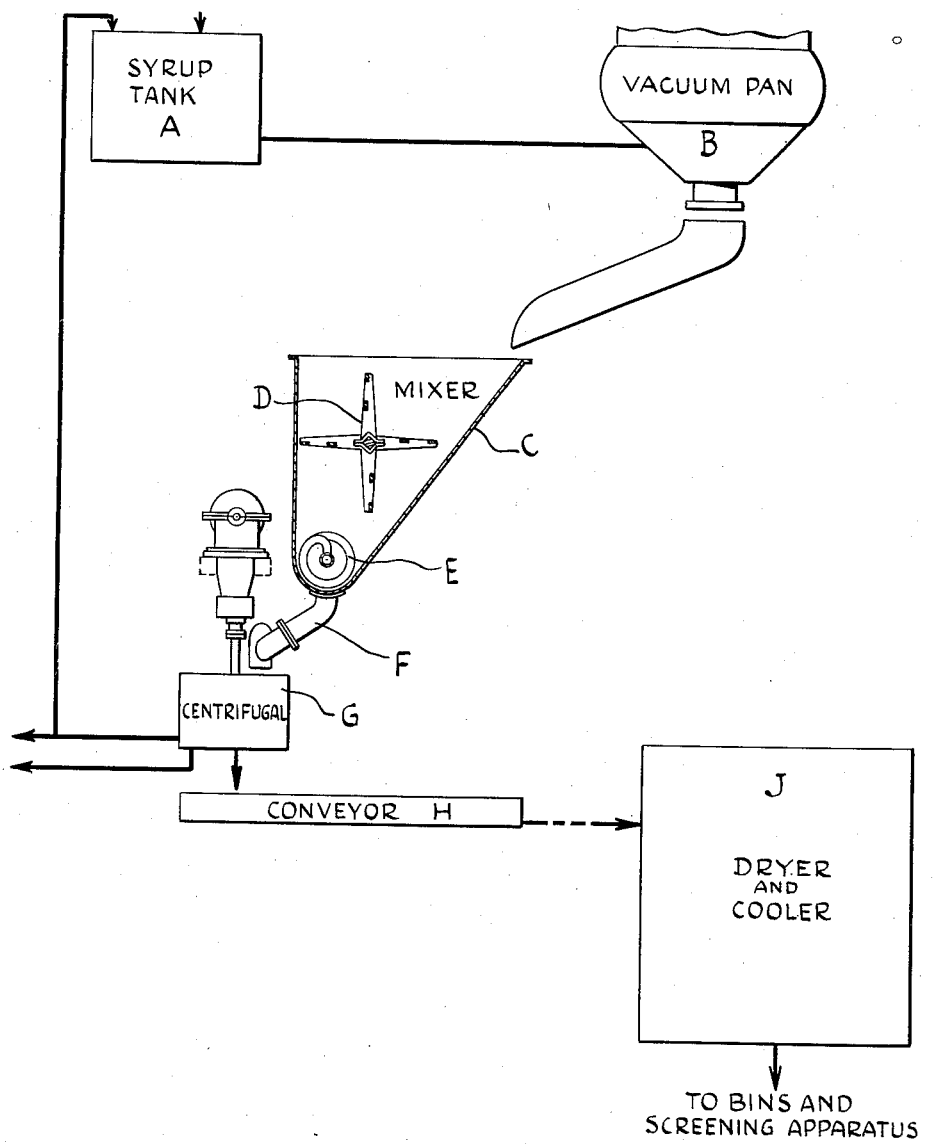
INVENTOR
EUGENE ROBERTS
BY
Hammond & Littell
ATTORNEYS Patented Oct. 10, 1939

2,175,996

UNITED STATES PATENT OFFICE 2,175,996

PROCESSING WHITE SUGAR

Eugene Roberts, Hastings, N. Y., assignor to The Western States Machine Company, New York, N. Y., a corporation of Utah Application May 1, 1937, Serial No. 140,092

6 Claims. (Cl. 127—46)

This invention relates to the processing of granulated white sugar, and it provides an improved process for the treatment of white sugar from the point of leaving the vacuum pan as a constituent of white massecuite to the point when conditioned for use.

The production of marketable granulated sugar from high grade syrup involves the basic steps of boiling the syrup in a vacuum pan until a massecuite of suitable consistency has been formed, dropping the massecuite into a receiving tank, introducing successive portions or charges from this tank into centrifugals where the mother liquor is separated from the crystals by centrifugal force and by the application of a washing fluid, partially drying the washed sugar in the centrifugals, discharging it from the centrifugals and, finally, drying, cooling and classifying the crystals.

My invention is concerned with the treatment of any relatively pure massecuite from which consumption sugar is produced that goes directly to the centrifugals from the vacuum pan whether derived from sugar beet or cane or other saccharine materials, and whether a so-called "first", "second" or "third" massecuite, by a new process embodying related improvements in these essential steps.

It is my principal object to provide a process which properly takes into consideration all of the factors encountered at the white sugar station, yet enables the production of granulated white sugar of improved quality and brilliancy, increases the net yield of crystals from a given volume of massecuite, increases the massecuite capacity of equipment, permits certain operations and equipment to be simplified or entirely omitted and permits desirable changes in the qualities of secondary materials requiring reprocessing to recover sugar values therein.

The existence of complicated and interrelated factors affecting the yields, capacity and quality obtainable in processing white sugar has been recognized prior to my invention, but no process correlating them for best results has been devised or applied in practice. According to prevailing practices, for example, the massecuite encounters cooling influences after leaving the vacuum pan, either in the mixer, the goosenecks leading to the centrifugals, or the centrifugals, and usually in all. With high crystallization, a slight decrease in temperature decreases fluidity and causes "smear", or the formation of additional crystal grains which render the massecuite difficult to handle and purge; hence crystallization in the massecuite body is controlled so as to preserve a necessary degree of fluidity through the processing of the batch, which usually occupies a period of from 1 to 2 hours. To keep the loss of yield at a minimum, however, fluidity is kept at a minimum. Correspondingly, caking and handling difficulties are enhanced, the charging of massecuite into the centrifugals and the spinning of the centrifugals are prolonged, the crystals are inadequately purged of their mother liquor, larger amounts of washing fluid are required, and the centrifuged crystals are relatively cool and not of best quality because of their relatively high moisture content and their rounded surfaces resulting from extended contact with the washing fluid.

Prevailing practices treat the centrifuging, final drying and cooling of the sugar essentially as independent operations. The relatively moist and cool sugar discharged from the centrifugals is handled, dried and cooled in a burdensome and uneconomical manner. Scroll conveyors usually move it in heavy masses and with a grinding effect to a chute leading to an elevator. The elevator carries it to a bin where it is accumulated until withdrawn and introduced into a so-called "granulator". In the granulator the sugar is lifted and dropped continually, and large volumes of steam heated air are passed through the dropping crystals in order to dry them. They are then selectively screened in order to remove lumps and powder, and then passed to packaging apparatus by means of further conveyors. Because of the high moisture content of the sugar and the method of handling, large quantities must be discarded as lumps or powder. The supposedly dried sugar is hot, and during cooling it "sweats" so that the frosty appearance induced by its initial high moisture content is enhanced by the drying of additional adherent syrup films. Its condition when dried requires that it be stored for a substantial period before shipment.

Although it has been proposed to overcome some of the difficulties mentioned above by conditioning the massecuite in the mixer with heat, the scope of improvement capable of being realized in white sugar processing by such conditioning has not been recognized heretofore, nor that conditioning with heat is not fully effectual unless preceding and subsequent operations of the process are adapted for it. Moreover, it has not been recognized that yields, capacity and quality may be improved simultaneously by suitable correlation of all the steps of the process.

An important feature of my invention consists in maintaining the sugar at high temperatures from the time of forming the crystals in the vacuum pan until the sugar is subjected to drying influences and in adapting the entire process so as to utilize these high temperatures to best advantage and obtain pronounced improvements in quality, yield and capacity.

Another important feature of my process consists in the adaptation of the centrifuging operations so that advantages resulting from preceding high temperature pan boiling and massecuite conditioning steps are preserved. I have found that prior centrifuging practices are unsuited to the preservation of these advantages. According to prior practices the centrifugals are charged while revolving at a low speed, and a considerable period of time is required to bring them to speeds sufficient to effect satisfactory separation of mother liquor. This charging practice in itself involves sacrifices in capacity and when combined with relatively slow acceleration of the centrifugals results in unnecessarily slow centrifuging cycles, and, of primary importance, permits the massecuite to cool and retards the effective removal of the mother liquor. I have found that the purging of the crystals may be greatly improved and that large decreases in the temperature of the white massecuite and purged crystals may be avoided by loading the centrifugals while they are revolving at substantial speeds, preferably during acceleration, and accelerating them considerably more quickly than heretofore, thus enabling improvements in the purging operations and in succeeding operations which are affected by the condition of the purged crystals.

As another important feature of the invention, I counteract the cooling influence of the spinning operation and prevent the temperature of the sugar in the centrifugals from falling to a point substantially below the pan temperature by using, as the washing medium, a suitable liquid such as water heated to temperatures above 175° F. At these temperatures and when applied during revolution of the centrifugals at high speed a small amount of wash water efficiently removes the remaining mother liquor, yet the water flashes through the sugar wall so quickly that there is relatively little loss of sugar per unit volume of water. The washed sugar consists of sharp-cornered, hot crystals having very low moisture and ash contents.

Still another important feature relates particularly to the final drying and cooling of the hot, relatively dry sugar obtained from the centrifugals when my process is followed. I have found that this sugar, when discharged from the centrifugals at temperatures above about 160° F. and with a moisture content of about 1.2% or less, may be easily dried by contact with unheated air and that a superior product is thus obtained. In transferring the sugar from the centrifugals to the drying station I find it advantageous to avoid delay and to modify or dispense with operations and equipment now used in accepted refinery practice.

My process results in additional advantages with respect to capacity and expense. For example, while improving the yield and quality of the sugar, the centrifuging cycle is considerably shortened. Because of the removal of so much mother liquor before the washing liquid is applied, the wash syrup is of as good or better quality than the original syrup, and in cane sugar refinery practice it may be collected separate from the mother liquor and returned directly to pan storage for introduction into the vacuum pan and reboiling as part of another batch of white massecuite. In beet factories, it may be combined with thick juice and melted sugar and filtered to form a standard white syrup.

Still other advantages of the invention will become apparent as the description proceeds.

The accompanying drawing illustrates diagrammatically a preferred arrangement of apparatus suitable for use in carrying out the process of my invention. It will be understood, of course, that the flow of the massecuite and the centrifuged sugar as indicated in the drawing may be varied in many respects without departing from the invention and that particular pieces of apparatus may also be varied so long as they remain capable of performing operations essential to the process.

In carrying out my process a quantity of high grade syrup from a syrup storage tank A is introduced into a vacuum pan B and there boiled in a well-known manner to produce a massecuite of the desired consistency. Prior to my invention it has been customary to maintain the vacuum pan at various temperatures and to drop the massecuite before the optimum crystallization has been attained, since, for the reasons explained above, massecuites fully developed at a given temperature cannot be handled and treated satisfactorily by the usual succeeding operations. In preparing a massecuite for processing in accordance with my invention, however, the syrup is boiled to high density at vacuum pan temperatures maintained between 175° and 195° F. and preferably between 180° and 190° F. At lower temperatures, for example 170° F., if processing is to be carried out in an economical manner and satisfactory control over the crystal formation is maintained by conducting the boiling in the so-called "metastable" zone of supersaturation the density of the resulting massecuite cannot be materially above about 91 percent. dry substance, and the usual density lies between about 88 and 90.5 percent. dry substance. When the pan is boiled at 180°–195° F., however, and the resulting massecuite is processed in accordance with the invention, the density of the massecuite may be considerably increased, as well as the percent. of crystallization, without adverse effects. It is quite satisfactory to process massecuites of 92.5 to 93 percent. dry substance, in which the percent. crystallization is considerably more than 50 percent. Improvements in yield amounting to several tons of sugar per strike of 2000 cubic feet of massecuite may thus be realized.

When the massecuite has been properly developed in the vacuum pan, the strike is dropped into a mixer C, where the entire body is immediately subjected to constant mixing and where the temperature of the massecuite is maintained about the same as in the vacuum pan by suitable stirring and heating means. While the construction of the mixer may assume many forms, I prefer to use the type of apparatus described in my United States Letters Patent No. 2,128,873, in which the heating of the massecuite takes place by maintaining relative movement between the massecuite and extended heated surfaces in accordance with the method and apparatus disclosed in United States Letters Patent Re. 20,556 and 2,086,951, granted to George E. Stevens on November 16, 1937, and July 13, 1937, respectively. In the illustrated embodiment heat is supplied to the massecuite in an amount sufficient at least to compensate for heat that is lost through radiation and conduction. This heat is transferred to the massecuite from a revolving coil E, which is heated by the circulation of a hot liquid therethrough but not permitted to rise to a point which would cause local overheating or caramelization of the massecuite. Coil E acts both as a stirring and as a heating means and is arranged to contact massecuite in the bottom portion of the tank. Stirrer D moves in a path spaced vertically from coil E but cooperates therewith to keep the entire body of massecuite in a state of agitation and to draw heat from E and distribute it uniformly throughout the massecuite. Thus I keep the entire body of massecuite at the same consistency, temperature and fluidity, and I control the degree of fluidity by control over the flow of heating liquid through the heating means.

If the pan temperature at which the massecuite is boiled is about 185° F. the addition of heat to the massecuite in the mixer C is controlled so as to keep the temperature of the massecuite in the mixer substantially at 185° F. Materially higher temperatures and dilution of the massecuite are avoided in order to avoid caramelization or dissolution of sugar crystals. Temperatures materially lower should be avoided in order to avoid the formation of "smear", to eliminate caking of the massecuite in the mixing and heating apparatus, and to keep the fluidity of the massecuite at the optimum point for centrifuging. This conditioning of the massecuite in the mixer is continued until the entire batch has been run off into the centrifugals. Each charge introduced into the centrifugals is therefore of the same consistency as every other charge, and uniformity of the final product is ensured.

From the mixer C the conditioned massecuite is introduced into a centrifugal G. For purposes of illustration, the drawing shows only one centrifugal, but it will be understood that any number may be positioned beneath a mixer and operated in succession so that in actual practice portions of massecuite from the mixer would be withdrawn and introduced into the several centrifugals.

The type of centrifugal unit which I prefer to employ is shown and described in my co-pending application, Serial No. 124,244, filed February 5, 1937, this type being especially suitable because of the accurate control which may be maintained over individual operations of the centrifuging cycle and the adaptability of such a unit for rapid acceleration and high speed operation.

Before a charge of massecuite is introduced into a centrifugal, the centrifugal is brought to a substantial speed, for example, 300 R. P. M. when the usual 40" basket is used. I prefer to apply full driving power to the centrifugal after a suitable loading speed has been reached and before the gate of the gooseneck F is opened so that the basket is loaded during acceleration between about 300 R. P. M. and 700 R. P. M. This preferred practice is followed in the processing of medium and fine grain massecuites, which are the kinds of massecuites most generally processed in American refineries. When used on massecuites conditioned as described above, this practice results in capacity increases of more than 15% at the centrifugal station as compared with accepted prior practice, since a large quantity of mother liquor is expelled from the charge during loading and a single basket accommodates a much larger charge of crystals. Loading during acceleration, however, is not essential, and for very coarse grain massecuites it may not be desirable because of the tendency of such massecuites to form an uneven and unbalanced wall within the basket and thus to interrupt and delay the centrifuging operation.

When curing a massecuite of high fluidity according to the present process the loading operation occupies a period of only a few seconds, and immediately after the basket has been loaded, or just before loading if loading takes place during acceleration, power is applied to the centrifugal in a manner quickly to accelerate the basket to high speed. The acceleration must be to a speed of at least 1250 R. P. M. in less than forty seconds. Splendid results are attained by accelerating to speeds of about 1400 R. P. M., 1500 R. P. M. or 1600 R. P. M. depending upon the grade and fineness of the grain in the massecuite, within at least one minute and preferably within 45 seconds. Again, these speeds refer to the usual 40" basket, and they are modified in accordance with the laws of centrifugal force for baskets of different sizes, as will be explained below. Much higher top operating speeds may be employed, as well as more rapid accelerations than specified.

I have found that rapid acceleration of the centrifugals to high speed is essential to the full practical utilization of hot dense massecuites and that it produces numerous additional advantages. The hot fluid massecuite introduced into the basket is immediately subjected to strong tearing forces which throw the mother liquor from the sugar crystals, to the extent of more than 90% of the total quantity, before the liquor has had an opportunity to cool and stiffen under the influence of the air currents created by revolution of the basket. According to prevailing prior practices the basket is slow in reaching an effective speed, and the charge in the basket is permitted to "smear" and to cool considerably and form a dense compact wall of crystals and stiff syrup before much more than 50% of the available mother liquor has been eliminated. Thereafter, prolonged and wasteful washing is required to obtain a product of satisfactory quality. According to my process, however, the liquor is thrown off so quickly and to such a great extent that this packing of crystals and liquors is avoided, and a pervious sugar wall consisting of hot sugar crystals and less than 10% of the total available liquor is formed within about 40 seconds.

In lieu of the usual prior practice, which involves the use of water at a temperature between about 120° and 150° F. as the washing fluid, I keep the temperature of the sugar from dropping much below the pan temperature by using a washing liquid, preferably water, at a temperature between 175° and 200° F. and preferably between about 185° and 195° F. For best results, this hot liquid is applied in the form of a spray and under pressure sufficient both to create a mist-like effect and to discharge the desired quantity in a short period of time, a pressure of the order of 30 lbs. per square inch at the nozzle being most satisfactory. Washing is begun after the centrifugal has reached a speed of 1200 R. P. M., when more than 80% of the available mother liquor has been eliminated and preferably after rapid acceleration, in the manner explained above, to a speed considerably greater than 1250 R. P. M. at which point more than 90% of the liquor is eliminated.

I have found that the hot wash water applied in this manner flashes through the wall of sugar in the basket with extreme rapidity, and that the remaining mother liquor adhering to the crystals is removed perfectly by much smaller amounts of water per unit volume of massecuite than have been used heretofore. Whatever cooling effect has been exerted on the sugar during rapid acceleration of the centrifugal is largely overcome by the heat of the wash water. Furthermore, although given amounts of wash water at 185° F. dissolve more sugar than at 130° F. if applied in accordance with prior centrifuging practice, I have found the opposite to be true when following my improved practice. Especially is this true if the flow of wash water is not continued substantially beyond the point when the sugar has been cleansed, since it has been discovered that up to a certain stage the amount of sugar taken out of the centrifugal per additional quart of wash water actually decreases, while beyond this stage it increases.

My process results in important improvements in yield because of the greatly decreased volume of washing fluid and the lesser amount of sugar carried away from the basket per unit volume. The washed sugar consists of pure crystals whose sharp cornered crystal structure is unimpaired by dissolution and relatively long contact with diluted syrup or water.

After a washing period varying with the fineness of the sugar grain from about 10 to about 25 seconds, during which from about 6 to about 16 quarts of washing liquid are applied to a loaded 40" basket, the flow of washing liquid is terminated. The spinning of the centrifugal at high speed may be continued for a short time, for example, about 10 to 40 seconds depending on the size of the crystals and the top speed of the centrifugal, in order partially to dry the washed sugar. Thereafter, the basket is brought to a stop, and the sugar is discharged, for example onto a conveyor H, in condition for final drying, cooling and classification.

The centrifuged white sugar produced by prior commercial practices leaves the centrifugals at a temperature usually in the neighborhood of 130° F., never above 150° F., and with a moisture content of from more than 2% for fine grain sugar to as low as 1% for coarse grain sugar. The centrifuged sugar produced by my process usually leaves the centrifugals at temperatures in the neighborhood of 170° to 180° F., and its moisture content is over 50% less than heretofore, namely, from about .1% to about 1.2%, depending upon the fineness of the grain. For practically all sugars the moisture content is considerably less than 1%.

From the foregoing parts of the description the importance of maintaining the temperature of the sugar between about 175° and 195° F. until the sugar is ready to be discharged from the centrifugals will be readily understood. The advantages of this feature, however, do not end with completion of the centrifuging operations.

I have found that the centrifuged sugar obtained by my process, with a moisture content usually less than 1%, and not more than 1.2% for extremely fine grain sugar, and at temperatures when leaving the centrifugals in excess of 160° F., can be dried with improvements in quality and savings in equipment and costs by contacting it with substantially unheated air before it has lost its sensible heat. The drying operation is also a cooling operation. The heat of the sugar at temperatures as low as 135° F. promotes vaporization of the moisture and heats up and decreases the relative humidity of the air in such manner that the relatively small amount of moisture is quickly dissipated. As drying proceeds, the sugar is cooled by the unheated air, and the tendency to "sweat" is completely avoided. In this manner a final dry product of high lustre and with substantially no tendency to lump is obtained, and the cost of heating the granulator, the practice of storing the sugar for cooling and the reprocessing of lumps, among other items, may be eliminated. The sugar may be loaded directly for shipment at the sacking station.

In order to carry out the drying operation I can, of course, use standard refinery equipment such as mentioned hereinabove, transferring the sugar quickly from the centrifugals to a substantially unheated granulator so as to avoid excessive loss of temperature. I prefer, however, to discharge the sugar from a centrifugal G into a conveyor H that is capable of keeping the sugar relatively spread out, and from this conveyor H to transfer the sugar into a drying and cooling device J where it is dried and cooled while being moved to storage or to classifying and packing apparatus. The method of handling, drying and cooling centrifuged white sugar possesses numerous advantages in respect of both the quality of the product, and the savings in equipment, floor space and drying costs that are effected by it.

The improvements in yield and high quality obtainable at the vacuum pan stage when following my process are indicated by the following chart showing the results of tests at various densities and pan boiling temperatures on white massecuites of comparable purity derived from sugar cane. Equal charges of the massecuites were spun in similar centrifugals at similar speeds and with the use of approximately the same amounts of wash water at about the same temperature.

*Massecuites from first inboiled pans—charges of 9 cu. ft.*

| Per cent dry substance | Per cent crystallization | Mass. temperature— | | Net pounds sugar— | | Type of crystal (observation) |
|---|---|---|---|---|---|---|
| | | As dropped | As spun (average) | Per cycle | Per 100 cu. ft. mass. | |
| 90.4 | 46.2 | 175 | 175 | 333 | 3666 | Fine-soft. |
| 90.6 | 48.3 | 184 | 183 | 357 | 3963 | Medium fine-hard. |
| 90.8 | 47.4 | 178 | 179 | 360 | 3996 | Medium fine-hard. |
| 91.2 | 50.0 | 182 | 180 | 386 | 4285 | Medium-hard. |
| 91.8 | 52.6 | 185 | 184 | 388 | 4307 | Medium fine-hard. |
| 92.0 | 51.1 | 179 | 178 | 398 | 4418 | Medium-hard. |
| 92.5 | 52.9 | 184 | 182 | 400 | 4444 | Medium fine-hard. |
| 92.6 | 54.6 | 187 | 185 | 406 | 4507 | Medium-hard. |

An increase in yield of only 20 lbs. per centrifugal cycle amounts to approximately two tons of sugar per pan strike of 1900 to 2000 cu. ft. of massacuite. Yield increases of greater than 10% are easily obtainable because of the changes that may be made at the pan stage alone.

The importance of the improved process in increasing the purity of centrifuged sugar is partially indicated by the following table showing the results of refinery operations. In these tests loading practices are uniform, and the massecuites were of comparable density but of higher density and higher initial temperatures than in prior practices.

Massecuite purity_____ 97.0   96.8
Per cent dry substance_____ 91.9   92.0

| | Prior practice | Improved process |
|---|---|---|
| 1. Percent ash in centrifuged sugar: | | |
| (a) Start of spinning operations | .0080 | .0068 |
| (b) Middle of spinning operations (45 minutes later than (a)) | .0117 | .0070 |
| (c) Near end of spinning operations | .0140 | .0070 |
| 2. Color grade of sugar solution (Hess Ives):* | | |
| (a) Start of spinning operations | 32 | 41 |
| (b) Middle of spinning operations | 28 | 41 |
| (c) Near end of spinning operations | 21 | 41 |
| Maximum R. P. M. of centrifugals | 1100 | 1500 |
| Seconds to reach maximum | 120 | 45 |
| Pounds wash water per 100 lbs. sugar (kept uniform throughout tests) | 9.3 | 5.6 |

*Lower Hess Ives color grade indicates presence of more color.

Data taken at the centrifugal station of a cane sugar refinery throw greater light on the importance of the improved process. These data relate to extra fine grain massecuites of the same density and purity, massecuites consisting to the extent of more than 80% of grains which will pass through a 40 mesh screen.

| 40" centrifugal baskets | Prior practice | Improved practice | Percent. change |
|---|---|---|---|
| Cu. ft. massecuite per charge | 8.96 | 11.25 | +25.6 |
| Average cycle-minutes | 3.00 | 2.52 | −16 |
| Cu. ft. massecuite per centrifugal per hour | 175.6 | 267.7 | +52.4 |
| Percent mother liquor eliminated at start of washing | 45–50 | 90–95 | +100 |
| Pounds sugar per centrifugal cycle | 326 | 462 | +41.7 |
| Pounds wash water per 100 lb. sugar | 7.1 | 3.5 | −50.7 |
| Percent centrifugal yield of crystallized sugar per unit volume massecuite | 44.35 | 50.11 | +13 |
| Percent moisture in centrifuged sugar | 2.11 | 1.04 | −50.7 |
| Percent ash in centrifuged sugar | .0051 | .0034 | −30.3 |
| Color grade of saturated sugar solution* | 318 | 371 | |
| Points reduction in color grade | | 53 | |
| Temperature of sugar leaving centrifugals °F | 85 | 176 | |

*Higher grade number here indicates less color.

In carrying out the final drying and cooling of centrifuged sugar according to my invention and with the use of standard refinery equipment results have been obtained as follows. The grain size and temperature of the sugar leaving the centrifugals were the same in both tests. In Test I the moisture content was somewhat lower than for sugar of similar grade obtained in the usual prior practice, while in Test II the sugar was produced in accordance with my improved process.

| Extra fine grain sugar | Test I | Test II |
|---|---|---|
| Condition of sugar leaving centrifugals: | | |
| Moisture content_____percent | 1.52 | 0.9 |
| Temperature_____°F | 174 | 174 |
| Temperature of outside air: | | |
| Dry bulb_____°F | 97 | 97 |
| Wet bulb_____°F | 87 | 87 |
| Conditions at granulator: | | |
| Temp. of air entering_____°F | 260 | *100 |
| Temp. of sugar entering_____°F | 139 | 139 |
| Condition of "dried" sugar: | | |
| Temp. leaving granulator_____°F | 165 | 103 |
| Moisture content_____percent | .035 | .018 |
| Temp. of sugar when sacked___°F | 138 | 96 |

*Steam completely shut off granulator.

The product of Test II, at 96° F. when sacked, was only 8 degrees above the warehouse temperature of 88° F. It consisted of clear brilliant crystals and exhibited no tendency to "sweat" or form lumps.

In order to facilitate application of my improved process to actual practice I have described the forces and accelerations applied to the materials in the centrifugals in terms of speeds of rotation. Wherever a specific speed is mentioned the reference is to a centrifugal embodying the usual basket of 40 inches in diameter. The invention is of course not limited to any particular centrifugal, and I wish it to be understood that any statement of actual speed of revolution in the specification and claims refers specifically to a 40 inch basket but comprehends also speeds of revolution of larger or smaller baskets sufficient to impart the same degree of force to the materials undergoing treatment. In dealing with baskets of practicable size the speed necessary to produce forces corresponding to any given speed of a 40 inch basket may be easily determined from the following equation, derived from the laws of centrifugal force:

$$N_b = \sqrt{\frac{1.667 N^2}{V_b}}$$

where $N_b$ is the speed of a basket whose radius, in feet, is $V_b$, and $N$ is the given speed for a 40 inch basket. The constant 1.667 is the radius, in feet, of the 40 inch basket.

It will be understood by those skilled in the art that the principles of my invention may be applied to the processing of various white massecuites without restriction to illustrative details described herein and that particular features of the invention may be employed to advantage even though the entire process and its full advantages be not adopted. I therefore desire that the invention be accorded a scope consistent with the spirit of the disclosure and the scope of the claims.

I claim:

1. In the processing of white sugar by forming a massecuite from syrup, centrifuging the massecuite to separate sugar and drying the sugar, the steps which comprise boiling syrup in a vacuum pan at temperatures in excess of 175° F. to produce white massecuite of greater than 50% crystallization and a fluidity at such temperatures permitting efficient handling and centrifuging, maintaining the entire body of massecuite at substantially the same consistency and temperature until centrifuged and the separated sugar at not materially lower temperatures until discharged from the centrifugal station, discharging the sugar from the centrifugal at a temperature of at least 160° F., and drying the discharged sugar, while still hot, in contact with a substantially unheated atmosphere by utilizing the sensible heat thereof.

2. The process for white sugar refining which comprises boiling syrup in a vacuum pan at a temperature between 175° F. and 195° F. to produce white massecuite of greater than 91 percent. dry substance, dropping the massecuite into a mixer and there maintaining its temperature and fluidity uniform and substantially the same as in the vacuum pan, introducing successive charges of the hot massecuite into a centrifugal and there separating more than 90% of the mother liquor in less than one minute by revolving the centrifugal to produce forces corresponding to those produced by accelerating a 40" centrifugal to a speed in excess of 1250 R. P. M. within 40 seconds from the introduction of the charge, thereafter further cleaning the remaining sugar and maintaining it at a high temperature by spraying with a washing medium in liquid form at a temperature above 175° F. while the centrifugal is revolving at high speed, and discharging from the centrifugal substantially pure sugar at a temperature in excess of 160° F. and having a moisture content of less than 1.2%.

3. The process for white sugar refining which comprises boiling syrup in a vacuum pan at a temperature between 175° F. and 195° F. to produce white massecuite of greater than 91 percent. dry substance, dropping the massecuite into a mixer and there maintaining its temperature and fluidity uniform and substantially the same as in the vacuum pan, introducing successive charges of the hot massecuite into a centrifugal during acceleration corresponding to the acceleration of a 40" centrifugal between about 300 and 700 R. P. M., separating more than 90% of the mother liquor in less than one minute by revolving the centrifugal to produce forces corresponding to those produced by accelerating a 40" centrifugal to a speed in excess of 1250 R. P. M. within 40 seconds from the introduction of the hot charge, thereafter further cleaning the remaining sugar and maintaining it at a high temperature by spraying with a washing medium in liquid form at a temperature above 175° F. while the centrifugal is revolving at high speed, and discharging from the centrifugal substantially pure sugar at a temperature in excess of 160° F. and having a moisture content of less than 1.2%.

4. The process of claim 2, and contacting the discharged sugar, while still hot, with a stream of substantially unheated air whereby to obtain brilliant, cool crystals having a moisture content of less than .05 percent.

5. The process for white sugar refining which comprises boiling syrup in a vacuum pan at a temperature between 180° F. and 195° F. to produce white massecuite of greater than 92 percent. dry substance and greater than 50 percent. crystallization, dropping the massecuite into a mixer and there maintaining its temperature and fluidity uniform and substantially the same as in the vacuum pan, introducing successive charges of the hot massecuite into a centrifugal and there separating more than 90% of the mother liquor in less than one minute by revolving the centrifugal to produce forces corresponding to those produced by accelerating a 40" centrifugal to a speed in excess of 1400 R. P. M. within 45 seconds from the introduction of the charge, thereafter further cleaning the remaining sugar and maintaining it at a high temperature by spraying with water in liquid form at a temperature above 185° F. while the centrifugal is revolving at high speed, and discharging from the centrifugal substantially pure sugar at a temperature in excess of 170° F. and having a moisture content of less than 1%.

6. In the processing of white sugar by boiling syrup in a vacuum pan to form white massecuite, centrifuging the massecuite to separate mother liquor from sugar, washing and drying the sugar, the steps which comprise washing the sugar during centrifuging after most of the mother liquor has been purged therefrom with a spray of washing medium in liquid form at a temperature above 175° F., discharging the centrifuged and washed sugar from the centrifugal at a temperature between 160° and 190° F. and with a moisture content of between .2 and 1.2% and drying the same while still hot by contacting it with substantially unheated air.

EUGENE ROBERTS.